(12) United States Patent
Kimura et al.

(10) Patent No.: US 8,281,681 B2
(45) Date of Patent: Oct. 9, 2012

(54) SHIFT-BY-WIRE SYSTEM

(75) Inventors: Kiyoshi Kimura, Obu (JP); Shigeru Yoshiyama, Kariya (JP); Taku Itoh, Chita-gun (JP); Yoshinobu Nozaki, Anjo (JP); Atsushi Kamada, Nishikamo-gun (JP)

(73) Assignee: Toyota Jidosha Kabushiki Kaisha, Toyota, Aichi-pref. (JP)

( * ) Notice: Subject to any disclaimer, the term of this patent is extended or adjusted under 35 U.S.C. 154(b) by 1330 days.

(21) Appl. No.: 11/957,696

(22) Filed: Dec. 17, 2007

(65) Prior Publication Data

US 2008/0173121 A1 Jul. 24, 2008

(30) Foreign Application Priority Data

Jan. 23, 2007 (JP) .................................. 2007-12821

(51) Int. Cl.
*B60K 17/00* (2006.01)
(52) U.S. Cl. ...................... 74/473.12; 74/335; 74/473.21
(58) Field of Classification Search ............... 74/473.12, 74/473.21, 473.23, 335
See application file for complete search history.

(56) References Cited

U.S. PATENT DOCUMENTS

| | | | | |
|---|---|---|---|---|
| 5,370,015 A * | 12/1994 | Moscatelli | ....................... | 74/335 |
| 5,827,149 A * | 10/1998 | Sponable | ........................ | 477/92 |
| 6,016,049 A | 1/2000 | Baughman et al. | | |
| 6,273,232 B1 * | 8/2001 | Kimura et al. | ............. | 192/219.6 |
| 6,378,393 B1 * | 4/2002 | Bates | .......................... | 74/473.18 |
| 6,484,598 B2 * | 11/2002 | Peter | .............................. | 74/335 |
| 6,589,134 B2 * | 7/2003 | Williams et al. | ................. | 477/99 |
| 6,619,459 B2 * | 9/2003 | Gudlin | ........................ | 192/219.4 |
| 6,752,036 B2 | 6/2004 | Kropp et al. | | |
| 6,880,419 B2 * | 4/2005 | Berger et al. | .................... | 74/335 |
| 6,918,314 B2 * | 7/2005 | Wang | .............................. | 74/335 |
| 7,082,851 B2 * | 8/2006 | Whitmarsh et al. | ........ | 74/473.11 |
| 2003/0221499 A1 * | 12/2003 | Wong | .............................. | 74/335 |
| 2006/0011003 A1 * | 1/2006 | Osamura et al. | ................ | 74/335 |
| 2006/0094565 A1 * | 5/2006 | Sato et al. | ........................ | 477/99 |
| 2006/0278029 A1 * | 12/2006 | Burgbacher | .................... | 74/335 |
| 2008/0039282 A1 | 2/2008 | Yoshiyama et al. | | |

FOREIGN PATENT DOCUMENTS

| | | |
|---|---|---|
| JP | 03-239865 | 10/1991 |
| JP | 2001-271917 | 10/2001 |
| JP | 2001-271925 | 10/2001 |
| JP | 2002-327843 | 11/2002 |
| JP | 2003-049942 | 2/2003 |
| JP | 2005-145278 | 6/2005 |
| JP | 2005-297796 | 10/2005 |
| JP | 2006-219253 | 8/2006 |

OTHER PUBLICATIONS

Japanese Office Action dated May 6, 2011, issued in corresponding Japanese Application No. 2007-012821 with English Translation.
U.S. Appl. No. 11/882,815 of Yoshiyama et al, filed Aug. 6, 2007.

* cited by examiner

*Primary Examiner* — Robert Pezzuto
*Assistant Examiner* — Matthew D Troutman
(74) *Attorney, Agent, or Firm* — Nixon & Vanderhye PC (57) ABSTRACT

A shift-by-wire (SBW) device includes a capacitor, which stores electric power. When an abnormality occurs in a battery or an electric power supply system, an actuator of the SBW device receives electric power from the capacitor and changes a shift range of an automatic transmission to a P range at least once. Furthermore, when a lever of a P range releasing arrangement is operated, the P range of the automatic transmission is released.

7 Claims, 6 Drawing Sheets

SHIFT-BY-WIRE SYSTEM

CROSS REFERENCE TO RELATED APPLICATION

This application is based on and incorporates herein by reference Japanese Patent Application No. 2007-12821 filed on Jan. 23, 2007.

BACKGROUND OF THE INVENTION

1. Field of the Invention

The present invention relates to a shift-by-wire system, which changes a shift range of an automatic transmission of a vehicle.

2. Description of Related Art

In recent years, in the field of vehicle control technique, by-wire systems have increasingly been employed. In general, the by-wire system electrically controls a corresponding actuator, which changes a corresponding operational state of the vehicle, based on a command of an occupant of the vehicle. For example, a shift-by-wire system, which changes a shift range of an automatic transmission of the vehicle based on a command of the occupant of the vehicle, is known (see, for example, Japanese Unexamined Patent Publication No. 2001-271917 and Japanese Unexamined Patent Publication No. 2004-513307 corresponding to U.S. Pat. No. 6,752,036).

It is required to enable secure parking of the vehicle and towing of the vehicle at the time of encountering an abnormality in the vehicle. In the case of the preexisting vehicle, the vehicle can be parked by changing the shift range of the automatic transmission to the P range or by using a parking brake. Furthermore, the vehicle can be easily towed by changing the shift range of the automatic transmission from the P range to another range.

In the case of the vehicle, which has the shift-by-wire system, the shift range of the automatic transmission is electrically changed. Therefore, for example, when an abnormality occurs in an electric power source or an electric power supply system (e.g., battery exhaustion, breaking of a conductive line), it becomes difficult to change the shift range of the automatic transmission. Furthermore, in the recent years, the parking brake is also electrically actuated. Thus, when the abnormality occurs in the electric power source or the electric power supply system, the secure parking of the vehicle may not be possible. Furthermore, when the shift range is changed to the P range, releasing of the P range may possibly become difficult, and thereby towing of the vehicle may also become difficult.

SUMMARY

Thus, it is an objective of the present exemplary embodiment to provide a shift-by-wire system, which enables secure parking of a vehicle and easy relocation of the vehicle even when an abnormality occurs in an electric power source or an electric power supply system on the vehicle.

To achieve the objective of the present exemplary embodiment, there is provided a shift-by-wire system, which includes an automatic transmission, a range position changing means, a range control means, a capacitor and a manual P range releasing means. The automatic transmission outputs a torque received from a drive power source upon changing a rotational speed. The range position changing means is for changing a shift range of the automatic transmission to one of a plurality of ranges, which includes a P range, an R range, an N range and a D range. The range position changing means is driven by an electric motor. The range control means is for controlling an electric power, which is supplied from an electric power source to the electric motor, and is for controlling the shift range of the automatic transmission to the one of the plurality of ranges. The capacitor stores an electric power to be supplied to the range position changing means and the range control means. The manual P range releasing means is for changing the shift range of the automatic transmission from the P range to another one of the plurality of ranges without using a drive force of the electric motor.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF EXEMPLARY EMBODIMENTS

An embodiment of the present invention will be described with reference to the accompanying drawings. In the following description, an electronic control unit will be abbreviated as an ECU.

Figure 1:
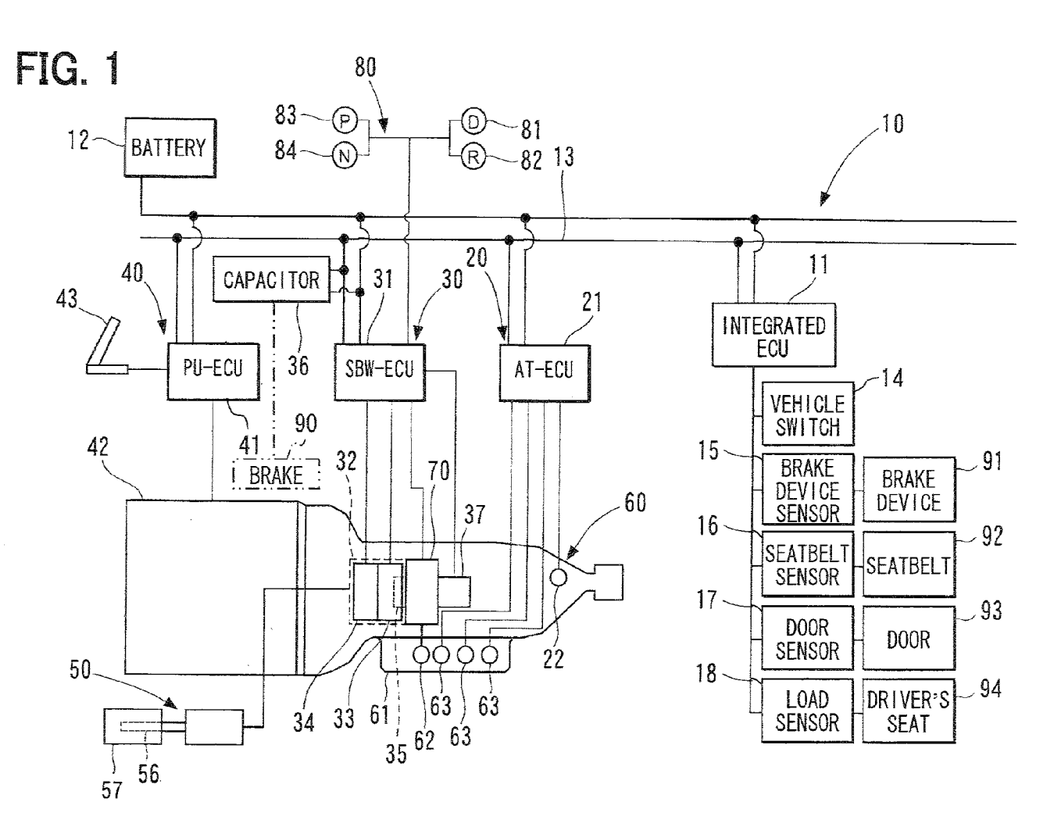
FIG. 1 is a block diagram showing a structure of a vehicle control system, in which an SBW device according to an embodiment of the present invention is applied.

FIG. 1 illustrates a vehicle control system 10, which incorporates a shift-by-wire device in accordance with the embodiment of the present invention. For example, the vehicle control system 10 employed in, for example, a four-wheel vehicle includes an automatic transmission controller 20, a shift-by-wire device 30 (hereinafter, referred to as a SBW device), a power source controller 40, an integrated ECU 11 and a P range releasing arrangement 50.

The automatic transmission controller 20, the SBW device 30 and the power source controller 40 have an AT-ECU 21, an SBW-ECU 31 and a PU-ECU 41, respectively Each of the integrated ECU 11, the AT-ECU 21, the SBW-ECU 31 and the PU-ECU 41 is an electronic device, which includes a microcomputer as its main component. The integrated ECU 11, the AT-ECU 21, the SBW-ECU 31 and the PU-ECU 41 are interconnected electrically or optically through conductive lines within the vehicle. The integrated ECU 11, the AT-ECU 21, the SBW-ECU 31 and the PU-ECU 41 are also electrically connected to a battery 12 (serving as an electric power source of the vehicle) and are thus electrically powered by the battery 12 through an electric power supply system 13. The integrated ECU 11 controls the entire vehicle control system 10 in cooperation with the AT-ECU 21, the SBW-ECU 31 and the PU-ECU 41.

The automatic transmission controller 20 hydraulically drives an automatic transmission 60 of the vehicle. The automatic transmission controller 20 includes a hydraulic circuit 61, which changes a shift range and a gear stage of the automatic transmission 60. The ranges of the automatic transmission 60 include a D range (a forward drive range), an R-range (a reverse drive range), a P range (a parking range) and an N range (a neutral range). The D range and the R range are collectively referred to as running ranges, and the P range and the N range are collectively referred to as non-running ranges. The hydraulic circuit 61 has a manual valve 62 for selecting a range position. The manual valve 62 is displaceable to switch the hydraulic circuit 61. When the manual valve 62 is driven to switch the hydraulic circuit, the automatic transmission 60 is set to a corresponding one of the aforementioned shift ranges. The automatic transmission 60 includes frictional engaging elements, each of which is placed in an engaged state or a disengaged state at a corresponding one of the shift ranges and/or the gear stages. In this way, the respective frictional engaging elements are placed in the engaged state or the disengaged state by the hydraulic pressure supplied from corresponding solenoid valves 63.

The AT-ECU 21 is electrically connected to electrical elements, such as the solenoid valves 63, of the hydraulic circuit 61. In this way, the AT-ECU 21 electrically controls the output hydraulic pressure of each solenoid valve 63. When the AT-ECU 21 controls the output hydraulic pressure of the corresponding solenoid valve(s) 63, each frictional engaging element of the automatic transmission 60 is placed in the engaged state or the disengaged state. Furthermore, in the present embodiment, the AT-ECU 21 is also electrically connected to a vehicle speed sensor 22, which measures a traveling speed (vehicle speed) of the vehicle based on a rotational speed (rpm) of an output shaft of the automatic transmission 60. The AT-ECU 21 determines the vehicle speed based on a measurement signal received from the vehicle speed sensor 22 and controls the respective solenoid valves 63 based on the determined vehicle speed.

The SBW device 30 includes an actuator 32, which drives the manual valve 62 of the automatic transmission 60. The actuator 32, which is electromagnetically operated, has a motor 33 and an encoder 34 The SBW-ECU 31 outputs a drive signal to the motor 33. Then, the motor 33 is rotated based on the drive signal supplied from the SBW-ECU 31. The rotational motion of the motor 33 is transmitted to the speed reducer 35 shown in FIG. 2, at which the rotational speed of the rotational motion is reduced, and is thereafter transmitted to a transmitting mechanism 70 shown in FIG. 3. The transmitting mechanism 70 transmits the drive force, which is received from the motor 33, to the manual valve 62 The actuator 32 of the SBW device 30 serves as a range position changing means of the present invention. The SBW-ECU 31 of the SBW device 30 serves as a range control means of the present invention.

Figure 2:
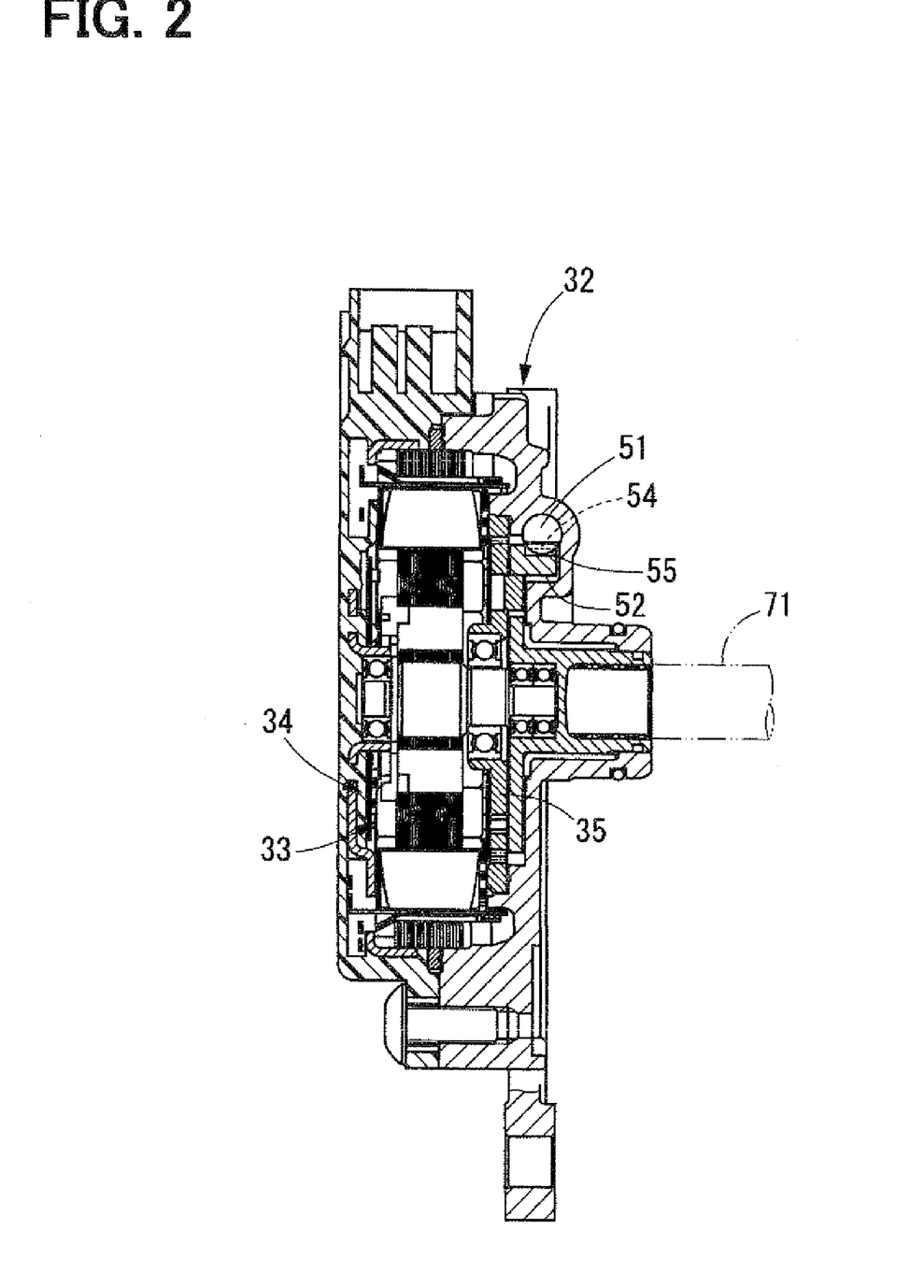
FIG. 2 is a cross sectional view along line II-II in FIG. 4.

As shown in FIGS. 1 and 2, the motor 33 of the actuator 32 is a brushless motor. Accordingly, the SBW-ECU 31 supplies electric power to the motor 33 in a predetermined energization pattern. Consequently, since the brushless motor is employed as the motor 33 of the actuator 32, the actuator 32 will not be operated unless the actuator 32 is controlled by the SBW-ECU 31. Thus, for example, even when the actuator 32 and the battery 12 are directly connected to each other, the actuator 32 having the motor 33 will not be driven. As a result, for instance, in a state where the shift range of the automatic transmission 60 is in the P range upon parking of the vehicle, the shift range of the automatic transmission 60 cannot be changed to any other range, which is other than the P range, even when the actuator 32 and the battery 12 are directly connected to each other. It is thus possible to provide an antitheft function and thus enhanced security for the vehicle.

Figure 3:
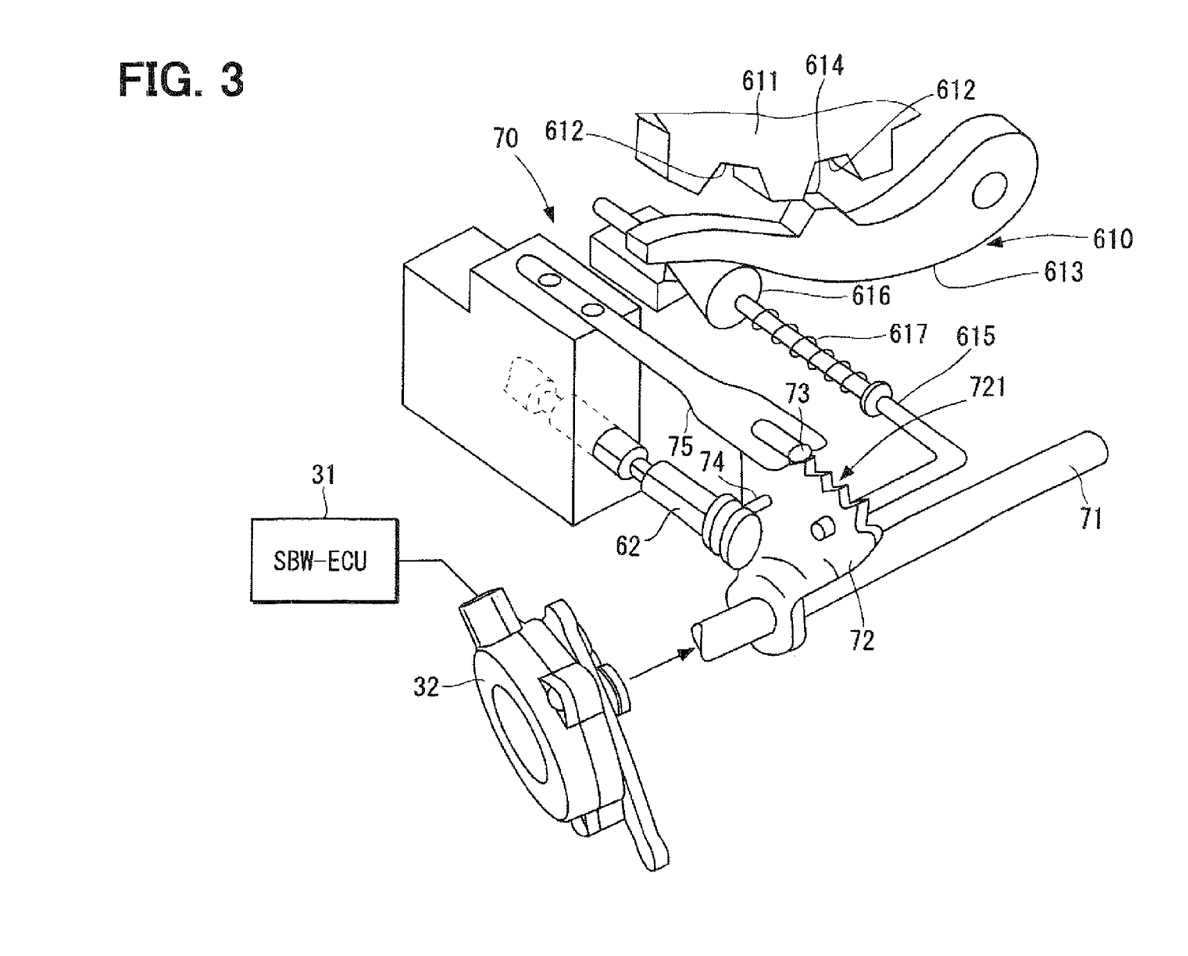
FIG. 3 is a schematic diagram showing a transmitting mechanism of the vehicle control system, in which the SBW device of the embodiment is applied.

As shown in FIG. 3, the transmitting mechanism 70 includes a drive shaft 71, a detent plate 72 and a roller 73. The drive shaft 71 is connected to the actuator 32 and is rotated by the actuator 32. The detent plate 72 extends radially outward from the drive shaft 71 and is held by the drive shaft 71 to rotate integrally with the drive shaft 71. In this way the detent plate 72 is rotated by the actuator 32. The detent plate 72 has a pin 74, which projects in parallel with the drive shaft 71. The pin 74 is connected to the manual valve 62. As a result, when the detent plate 72 is rotated together with the drive shaft 71, the manual valve 62 is reciprocated in the axial direction. Therefore, the transmitting mechanism 70 converts the rotational drive force of the actuator 32 into a linear motion and transmits the linear motion to the manual valve 62.

The detent plate 72 has a plurality of recesses 721 at a radially outer end portion thereof, which is opposite from the drive shaft 71 in the radial direction. The recesses 721 are associated with the different shift ranges of the automatic transmission 60, respectively. The roller 73 is supported at a distal end portion of a leaf spring 75. When the roller 73 is mated with any one of the recesses 721 of the detent plate 72, the axial position of the manual valve 62 is determined. When a rotational force is applied to the detent plate 72 through the drive shaft 71, the roller 73 is moved to another adjacent one of the recesses 721. Accordingly, when the drive shaft 71 is rotated by the actuator 32, the axial position of the manual valve 62 is changed, and thereby the shift range of the automatic transmission 60 is changed.

As shown in FIG. 3, the automatic transmission 60 has a parking lock arrangement 610. The parking lock arrangement 610 limits rotation of the output shaft of the automatic transmission 60 by mating a pawl 614 of a lock arm 613 to one of recesses 612 formed in an outer peripheral portion of a parking gear 611. A rod 615 of the parking lock arrangement 610 is formed generally into an L-shape. One end of the rod 615 is fixed to the detent plate 72, and the other end of the rod 615 is connected to a cone head 616 that is formed into a tapered cone shape. A spring 617 urges the cone head 616 against the lock arm 613 in a manner that enables axial reciprocal movement of the cone head 616. When the cone head 616 is axially reciprocated upon rotation of the detent plate 72, the cone head 616 drives the lock arm 613 in the vertical direction n FIG. 3 When the detent plate 72 is rotated to a predetermined angle, at which the recess 721 of the detent plate 72 corresponding to the P range mates with the roller 73, the manual valve 62 is shifted to a P range position, and the cone head 616 urges the lock arm 613, so that the pawl 614 of the lock arm 613 mates with the recess 612 of the parking gear 611. As a result, the rotation of the output shaft of the automatic transmission 60 is mechanically limited, and thereby the automatic transmission 60 is placed in the P range.

As shown in FIG. 1, the SBW device 30 includes capacitor 36. The capacitor 36 is placed between battery 12 (the electric power source) and SBW-ECU 31. The capacitor 36 stores electric power supplied from battery 12. The capacitor 36 may be dedicated solely to the SBW device 30 as in this embodiment, or alternatively may also be shared with another system. For example, in a case where the vehicle control system 10 includes an electrical brake device 90 having a capacitor 36, the capacitor of the electrical brake device 90 may be shared with the SBW device 30 as capacitor 36. Furthermore, capacitor 36 may be disposed at any position as long as it is capable of storing electric power supplied from battery 12 and is capable of supplying stored electric power to the SBW-ECU 31 and actuator 32.

A neutral switch 37 detects the actual shift range of the automatic transmission 60. The neutral switch 37 detects the position of the manual valve 62. The neutral switch 37 determines the position of the manual valve 62 among the P range position, the R range position, the N range position and the D range position. Then, the neutral switch 37 outputs the determined position of the manual valve 62 in a form of an electrical signal to the SBW-ECU 31.

The SBW-ECU 31 is electrically connected to the motor 33 the encoder 34, the neutral switch 37 and a range selector 80 (serving as a vehicle range input means). An occupant (driver) of the vehicle inputs a desired shift range through the range selector 80. For example, the encoder 34 may be a rotary encoder. The encoder 34 outputs pulse signals based on the rotational angle of the motor 33, and the SBW-ECU 31 counts these pulse signals to determine the rotational angle of the motor 33. The SBW-ECU 31 executes a feedback control to drive the motor 33 based on the rotational angle of the motor 33. As described above, the shift range of the automatic transmission 60 varies depending on the rotational angle of the motor 33. Accordingly, the rotational angle of the motor 33, which is determined by counting the pulse signals of the encoder 34, indirectly indicates the shift range achieved by the automatic transmission 60.

In this embodiment, the range selector 80 has a D range switch 81, an R range switch 82, a P range switch 83 and an N range switch 84. The occupant of the vehicle may input the desired running range to the SBW-ECU 31 through the D range switch 81 or the R range switch 82. When the SBW-ECU 31 receives the input from the D range switch 81 or the R range switch 82, the SBW-ECU 31 changes the shift range of the automatic transmission 60 to the inputted range through the actuator 32 Alternatively, the occupant of the vehicle may input the desired non-running range to the SBW-ECU 31 through the P range switch 83 or the N range switch 84. When the SBW-ECU 31 receives the input from the P range switch 83 or the N range switch 84, the SBW-ECU 31 changes the shift range of the automatic transmission 60 to the inputted range through the actuator 32. For example, the range selector 80, through which the occupant of the vehicle selects the desired shift range of the automatic transmission 60, is placed at a suitable location, such as a console of the vehicle or a steering wheel, where the occupant of the vehicle can easily operate the range selector 80. The range selector 80 does not necessarily employ switches as the input means but may employ a lever as the input means.

The PU-ECU 41 is electrically connected to a drive power source 42 of the vehicle. For example, the vehicle drive power source 42 may be an internal combustion engine, an electric motor, or a combination thereof. For example, the internal combustion engine may be a gasoline engine, a diesel engine, or an engine powered by other fuels such as ethanol. In the case where the internal combustion engine is used as the drive power source 42, the PU-ECU 41 controls the output of the drive power source 42 by controlling, for example, a flow quantity of intake air, an injection quantity of fuel. In another case where the motor is used as the drive power source 42, the PU-ECU 41 controls the output and the rotational direction of the drive power source 42 by controlling the voltage, the current and/or the frequency of the electric power supplied to the motor. When an accelerator pedal 43 is depressed by the occupant of the vehicle, the PU-ECU 41 controls the drive power source 42 based on an amount of depression of the accelerator pedal 43. As a result, the PU-ECU 41 adjusts the rotational speed and the output torque of the drive power source 42. Here, it should be noted that the input, which indicates the operational state of the drive power source 42, is not limited to the amount of depression of the accelerator pedal 43. For instance, an operational amount of any other means, such as an accelerator lever or an accelerator switch, may be used as the input, which indicates the operational state of the drive power source 42.

The vehicle control system 10 includes a vehicle switch 14. The vehicle switch 14 turns on and off the operation of the entire vehicle control system 10, including the drive power source 42. Specifically, the vehicle switch 14 corresponds to a switch of the invention. For example, in a case of a vehicle, which has the internal combustion engine as the drive power source 42, the vehicle switch 14 may be an ignition switch. Also, for example, in a case of a vehicle, which has the motor as the drive power source 42, the vehicle switch 14 may be an electric power source switch of the motor. The integrated ECU 11 senses ON and OFF of the vehicle switch 14.

The integrated ECU 11 is connected with not only the vehicle switch 14 but also, for example, a brake device sensor 15, a seatbelt sensor 16, a door sensor 17 and a load sensor 18. The brake device sensor 15 is connected to a vehicle brake device 91. The brake device sensor 15 senses whether the vehicle brake device 91 is working, i.e., is applying a braking force to vehicle wheels. In this case, for example, the brake device sensor 15 senses whether the occupant of the vehicle is depressing the brake pedal (not shown). The seatbelt sensor 16 senses whether the seatbelt 92 is fastened. When the seatbelt 92 is connected to a harness (not shown), the seatbelt sensor 16 detects the fastening of the seatbelt 92. The door sensor 17 senses whether a vehicle door 93 is opened or closed. The load sensor 18 detects whether the occupant is seated in a driver's seat 94. When a load, which is exerted on the driver's seat 94, becomes less than or equal to a predetermined value, the load sensor 18 determines that no occupant is seated in the driver's seat 94.

Figure 4:
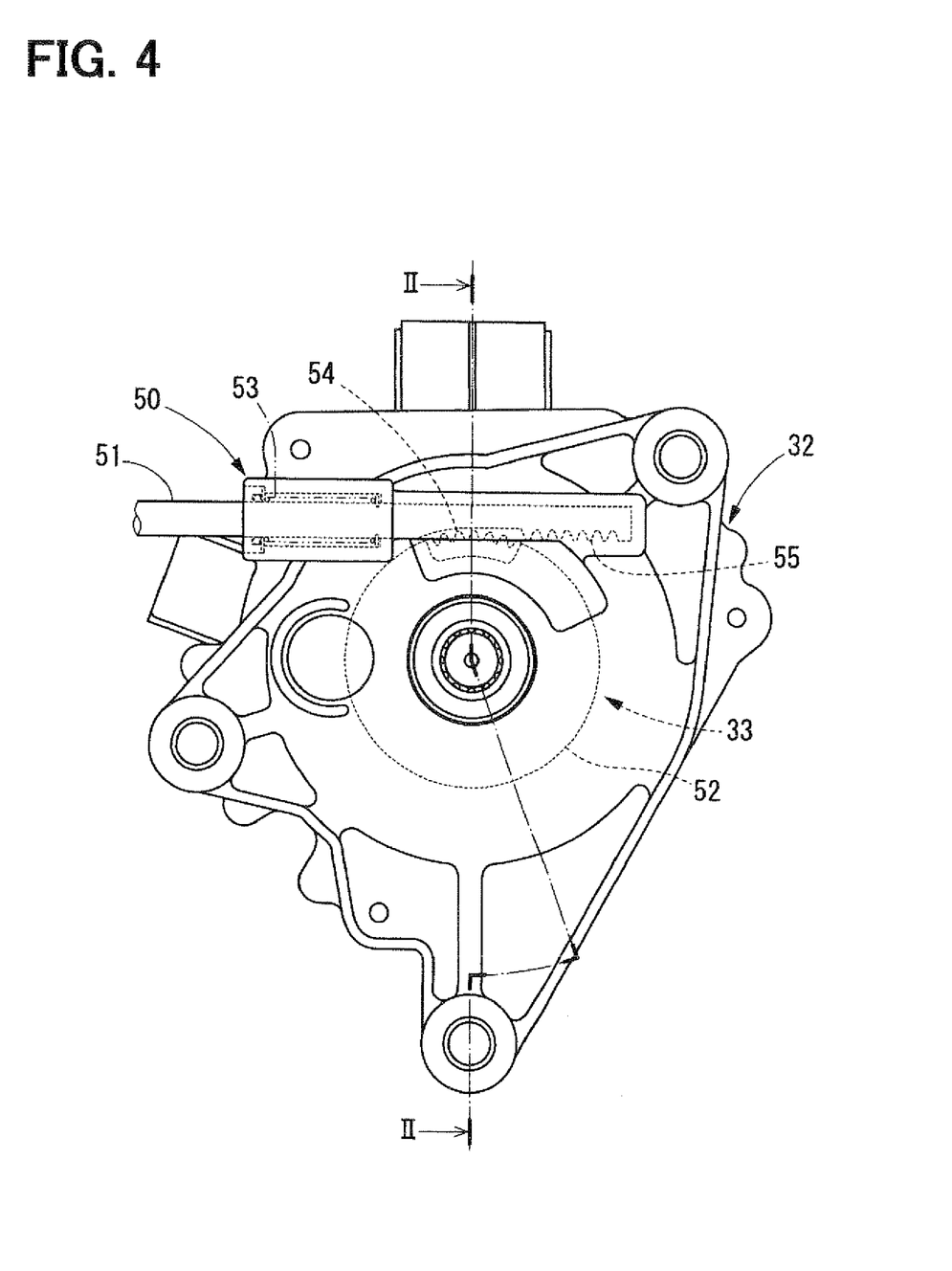
FIG. 4 is a schematic diagram showing an actuator of the SBW device of the embodiment.

The P range releasing arrangement 50, which serves as a manual P range releasing arrangement, is provided in the SBW device 30. The P range releasing arrangement 50 externally drives the actuator 32 of the SBW device 30 As shown in FIGS. 2 and 41 the P range releasing arrangement 50 has a rod 51, a rotatable plate 52 and a spring 53 (serving as a resilient member). The rod 51 is disposed generally perpendicular to the axial direction (rotational axis) of the motor 33 of the actuator 32. The rotational motion of the motor 33 of the actuator 32 is transmitted to the rotatable plate 52 through the speed reducer 35. When the rotatable plate 52 is rotated, the manual valve 62 is driven through the transmitting mechanism 70 The rotatable plate 52 has a toothed portion 54, as shown in FIG. 4. The toothed portion 54 is engageable with a toothed portion 55, which is provided in an axial end portion of the rod 51. The toothed portion 54 of the rotatable plate 52 is formed along at least a portion of the outer peripheral edge of the rotatable plate 52 in the circumferential direction thereof. Here, the toothed portion 54 may be formed along the entire outer peripheral edge of the rotatable plate 52.

The other axial end portion of the rod 51, which is opposite from the toothed portion 55, is connected to a lever 56, as shown in FIG. 1. When the occupant of the vehicle operates the lever 56, the rod 51 is moved in the axial direction. The spring 53 urges the rod 51 toward the right side in FIG. 4, i.e., toward an initial position. Accordingly, when no force is applied to the rod 51 through the lever 56, the spring 53 urges the rod 51 to the initial position shown in FIG. 4. When the rod 51 is at the initial position, the toothed portion 55 of the rod 51 is disengaged from the toothed portion 54 of the rotatable plate 52. Thus, when the rod 51 remains at the initial position, the rotatable plate 52, i.e., the actuator 32 is driven without interfering the rod 51.

Figure 5:
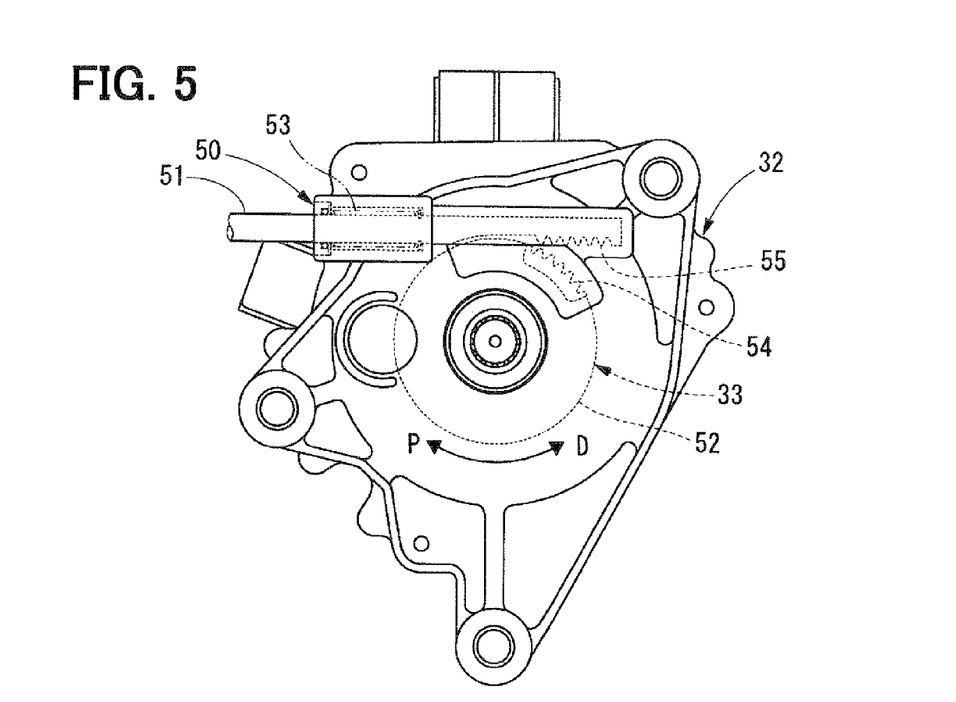
FIG. 5 is a schematic diagram showing the actuator of the SBW device of the embodiment, in which a rod is in an initial position, and a shift range is in a P range.

As shown in FIG. 5, when the rod 51 is moved toward the initial position, the rotatable plate 52 is rotated in the clockwise direction in FIG. 5. Thus, the shift range of the automatic transmission 60 is changed to the P range side by the manual valve 62, which is connected to the actuator 32. Then, when the rod 51 is moved to the initial position, the engagement between the rod 51 and the rotatable plate 52 is released.

Figure 6:
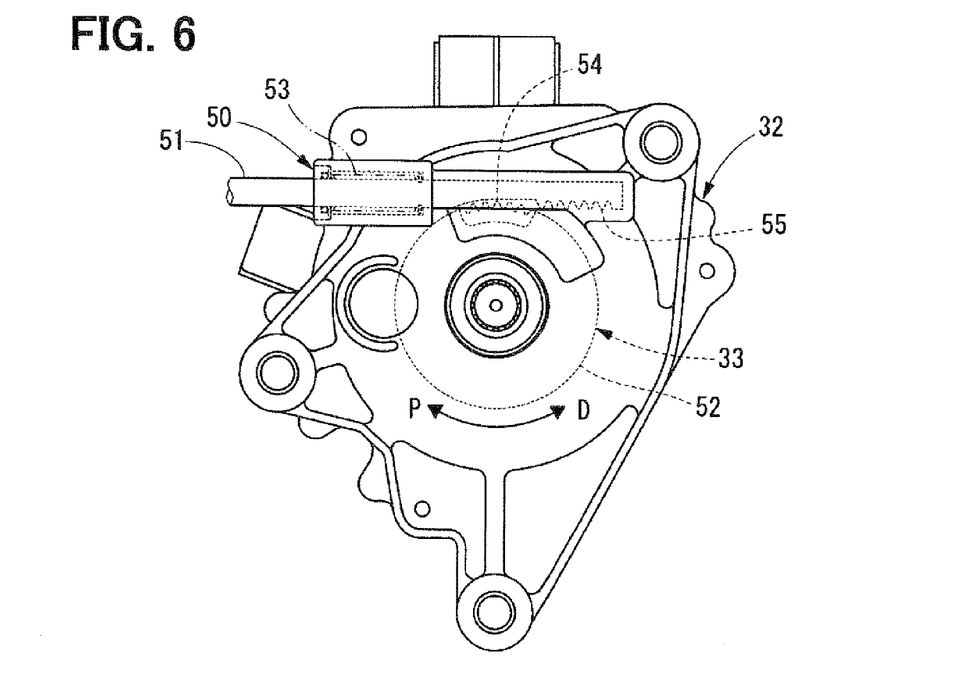
FIG. 6 is a schematic diagram showing the actuator of the SBW device of the embodiment, in which the rod is in the initial position, and the shift range is in a D range.

When the rod 51 is in the initial position, the engagement between the rod 51 and the rotatable plate 52 is released. Accordingly rotational movement of the rotatable plate 52 is not limited by the rod 51. As a result, when the shift range of the automatic transmission 60 is changed to the D range as shown in FIG. 6, the toothed portion 55 of the rod 51 and the toothed portion 54 of the rotatable plate 52 are not engaged with each other. Thus, no force is exerted from the rod 51 onto the rotatable plate 52.

The lever 56, which is connected to the rod 51, is placed to the suitable location, at which the occupant seated in the driver's seat 94 of the vehicle can access and operate the lever 56. Additionally, the lever 56 is placed to the location, at which the occupant seated in the driver's seat 94 cannot easily visually recognize the lever 56. Therefore, the erroneous operation of the lever 56 can be limited during the normal driving operation of the vehicle, Thus, it is possible to provide enhanced safety for the vehicle. Furthermore, at the time of operating the lever 56, which is connected to the rod 51, authentication is required. As shown in FIG. 1, the lever 56 is received in a container 57, which has a cover that covers an opening of the container 57. For example, the opening and closing of the cover of the container 57, which receives the lever 56, is enabled with a vehicle key. The vehicle key is usually only held by the owner of the vehicle. Accordingly, the security with respect to the operation of the lever 56 is improved when the vehicle key is used for the authentication. It is thus possible to provide an antitheft function for the vehicle. Here, the authentication, which is required to operate the lever 56, is not limited to the opening and closing of the container 57 having the cover, and any other means may be used for this authentication.

The description will now be made to the operation of the SBW device 30 of the vehicle control system 10.

First, an operation at the time of encountering an abnormality in the electric power system, which includes the battery 12 and the electric power supply system 13, will be described.

When the abnormality occurs in the electric power source (e.g., the battery 12) and/or in the conductive line of the electric power supply system 13, the power supply from the battery 12 to the SBW device 30 may be stopped. However, the capacitor 36 is charged with the electric power, which is supplied from the battery 12 upon turning on of the vehicle switch 14. Therefore, even when the abnormality occurs in the battery 12 and/or the electric power supply system 13 to stop its power supply to the SBW device 30, the SBW device 30 can be operated with the electric power, which is stored in the capacitor 36. Furthermore, the electric power, which is stored in the capacitor 36, may also be supplied to the integrated ECU 11 and/or the other ECU(s).

More specifically, when the abnormality occurs in the battery 12 and/or the electric power supply system 13 to stop the electric power supply, the SBW-ECU 31 determines whether the shift range of the automatic transmission 60 can be changed to the P range. For example, at the time of running the vehicle, when the shift range of the automatic transmission 60 is changed to the P range, the vehicle may possibly exhibit an unexpected behavior to deteriorate the safety of the vehicle. In view of this, the SBW-ECU 31 receives information of the running state of the vehicle from, for example, the vehicle speed sensor 22 and the integrated ECU 11. Furthermore, the SBW-ECU 31 detects whether the vehicle has been stopped safely based on the output values, which are received from, for example, the brake device sensor 15, the seatbelt sensor 16, the door sensor 17 and the load sensor 18. During this period, the SBW-ECU 31 and the integrated ECU 11 are driven with the electric power stored in the capacitor 36 When the SBW-ECU 31 determines that the vehicle is stopped safely, the SBW-ECU 31 supplies a predetermined amount of electric power to the actuator 32 Then, the SBW-ECU 31 commands the actuator 32 to drive the manual valve 62 to change the shift range of the automatic transmission 60 to the P range. The SBW-ECU 31 uses the electric power stored in the capacitor 36 to drive the actuator 32 to change the shift range of the automatic transmission 60 to the P range. That is, the manual valve 62 of the automatic transmission 60 is moved to the P range position, and the parking lock arrangement 610 mechanically limits the rotational movement of the output shaft of the automatic transmission 60.

As described above, the capacitor 36 supplies the electric power to the SBW-ECU 31 and the actuator 32. The capacitor 36 stores the sufficient amount of electric power, which is sufficient to change the shift range of the automatic transmission 60 to the P range at least once. In this way, even when the supply of the electric power from the battery 12 to the SBW device 30 is stopped, the shift range of the automatic transmission 60 can be changed to the P range at least once. It is thus possible to safely park the vehicle.

At the time of changing the shift range of the automatic transmission 60 to the P range, the occupant of the vehicle may determine and command its timing. For example, it is possible to configure as follows. That is, when the vehicle is securely parked in a safe place, the occupant of the vehicle may press the P range switch 83, so that the shift range of the automatic transmission 60 is changed to the P range using the electric power stored in the capacitor 36. Alternatively, the SBW-ECU 31 may automatically change the shift range of the automatic transmission 60 to the P range based on the information received from the various sensors as described above.

Now, a releasing operation for releasing the P range of the automatic transmission 60 will be described.

As described above, even when the abnormality occurs in the electric power source (e.g., the battery 12) and/or the conductive line of the electric power supply system 13, the shift range of the automatic transmission 60 can be changed to the P range. In this way, the vehicle is parked safely. When the parked vehicle needs to be relocated by, for example, towing, the shift range of the automatic transmission 60 must be changed to the other range, which is other than the P range. In this embodiment, the shift range of the automatic transmission 60 can be changed to the other range, which is other than the P range, by operating the P range releasing arrangement 50.

Figure 7:
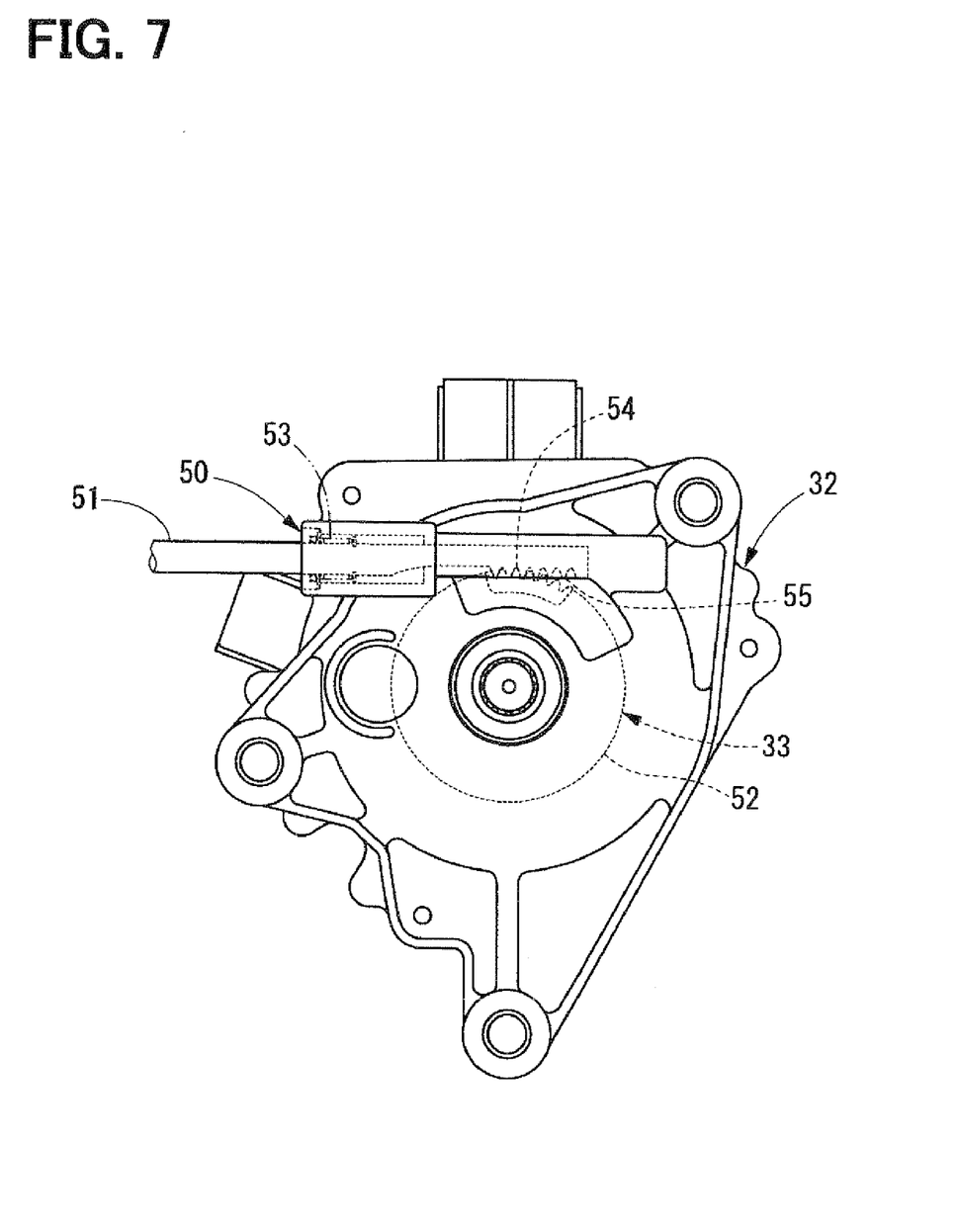
FIG. 7 is a schematic diagram showing the actuator of the SBW device of the embodiment, in which the rod is out of the initial position, and the shift range is in an N range.

As shown in FIGS. 4 and 5, when the shift range of the automatic transmission 60 is in the P range, the spring 53 urges the rod 51 to the initial position At the time of releasing the shift range of the automatic transmission 60 from the P range, the occupant of the vehicle operates the lever 56, which is connected to the rod 51. When the lever 56 is operated, the rod 51 is moved toward the left side in FIG. 5 against the urging force of the spring 53. In this way, as shown in FIG. 7, the toothed portion 55 of the rod 51 is engaged with the toothed portion 54 of the rotatable plate 52 and is thereby moved together with it. As a result, the rotatable plate 52 is rotated in the counterclockwise direction from the position shown in FIG. 5 to the position shown in FIG. 7. When the rotatable plate 52 is rotated in the counterclockwise direction from the position shown in FIG. 5 to the position shown in FIG. 7, the manual valve 62, which is connected to the rotatable plate 52, is also moved. Thus, the shift range of the automatic transmission 60 is changed from the P range to, for example, the N range.

At this time, the urging force of the spring 53, which urges the rod 51 toward the initial position, is less than the detent force of the automatic transmission 60, i.e., the force for maintaining the currently selected shift range of the automatic transmission 60. The detent force is the force that is required to move the roller 73, which is engaged with the corresponding one of the recesses 721 of the detent plate 72, to the next adjacent one of the recesses 721. This detent force is less than the drive force of the actuator 32. Accordingly, when the actuator 32 generates the drive force, the detent plate 72 and the manual valve 62 are driven by it. In this embodiment, the urging force of the spring 53, which urges the rod 51, is less than this detent force. Accordingly, the detent plate 72 will not rotate even when the urging force of the spring 53 is applied to the rod 51. That is, the shift range of the automatic transmission 60 will not be changed by the urging force of the spring 53 alone. As a result, when the lever 56, which is connected to the rod 51, is operated to change the shift range of the automatic transmission 60 from the P range to, for example, the N range, the shift range of the automatic transmission 60 will be maintained in the N range.

As described above, when the rod 51 is operated through the lever 56, the shift range of the automatic transmission 60 is changed from the P range to the other range. Accordingly, even when the power supply from the battery 12 to the SBW device 30 is stopped, and the shift range of the automatic transmission 60 is changed to the P range, the shift range of the automatic transmission 60 can be changed without relying on the drive force of the actuator 32. It is thus possible to easily relocate the securely parked vehicle, for example, by towing.

Now, a returning operation for returning of the rod 51 to the initial position will be described.

When the electric power source (e.g., the battery 12) and/or in the conductive line of the electric power supply system 13 is restored from the abnormality upon manual releasing of the shift range of the automatic transmission 60 from the P range, the SBW device 30 will operate normally. At this time, when the actuator 32 is driven upon the operation of the SBW device 30, the rotatable plate 52 is rotated from the position of FIG. 7 to the position of FIG. 5 in the clockwise direction. In this way, for example, as shown in FIG. 7, the rod 51, which is engaged with the rotatable plate 52, is moved toward the right side in FIG. 7. Then, as shown in FIGS. 4 to 6, the urging force of the spring 53 urges the rod 51 to the initial position. As a result, the engagement between the rod 51 and the rotatable plate 52 is released. Thus, the rod 51 is returned to the initial position, and thereby the actuator 32, which includes the rotatable plate 52, is operated without interfering with the rod 51.

As described above, according to the embodiment of the present invention, even in the case where the abnormality occurs in the battery 12 and/or the electric power supply system 13, the integrated ECU 11, the SBW-ECU 31 and the actuator 32 of the SBW device 30 can be powered by the electric power, which is stored in the capacitor 36, to change the shift range of the automatic transmission 60 to the P range at least once. It is thus possible to safely and securely park the vehicle.

Furthermore, according to the embodiment of the present invention, the shift range of the automatic transmission 60 can be manually released from the P range by operating the lever 56. It is thus possible to easily relocate the parked vehicle, for example, by towing. Also, during the normal operation, in the P range releasing arrangement 50 that manually releases the shift range of the automatic transmission 60 from the P range, the rod 51 is held in the initial position by the spring 53. When the rod 51 is in the initial position, the rod 51 is not engaged with the rotatable plate 52. Thus, when no abnormality is present in the battery 12 and the electric power supply system 13, the P range releasing arrangement 50 will not interfere with the operation of the actuator 32 and the automatic transmission 60. Therefore, the SBW device 30 can be reliably operated.

Additional advantages and modifications will readily occur to those skilled in the art. The invention in its broader terms is therefore not limited to the specific details, representative apparatus, and illustrative examples shown and described.

What is claimed is:

1. A shift-by-wire system for a vehicle, said system comprising:
   an automatic transmission that outputs torque received from a drive power source upon changing a rotational speed;
   a range position changing means for changing a shift range of the automatic transmission to one of a plurality of ranges, which includes a P range, an R range, an N range and a D range, wherein the range position changing means is driven by an electric motor;
   a range control means for controlling electric power, which is supplied from an electric power source to the electric motor through an electric power supply system, and for controlling the shift range of the automatic transmission to one of the plurality of ranges;
   a capacitor that stores electric power to be supplied to the range position changing means and the range control means; and
   a manual P range releasing means for changing the shift range of the automatic transmission from the P range to another one of the plurality of ranges without using drive force of the electric motor,
   wherein
   the range control means determines whether the vehicle is stopped when the range control means senses an abnormality of at least one of the electric power source and the electric power supply system which disables supply of a required level of electric power from the electric power source to the electric motor; and
   wherein, when the range control means determines that the vehicle is stopped upon sensing of the abnormality, the range control means shifts the shift range of the automatic transmission to the P range through the range position changing means upon supplying electric power from the capacitor to the range position changing means to drive the electric motor in a case where the shift range of the automatic transmission is currently other than in the P range.

2. The shift-by-wire system according to claim 1, wherein the manual P range releasing means includes:
   a rod that is engageable with the range position changing means to transmit an external drive force to the range position changing means; and a resilient member that urges the rod toward an initial position, at which the range position changing means is placed in a P range position to place the automatic transmission in the P range; and wherein:

when the rod is placed in the initial position, engagement between the rod and the range position changing means is released;

an urging force of the resilient member, which urges the rod, is set to be smaller than a detent force, which holds the shift range of the automatic transmission; and the rod is returned to the initial position when the range position changing means changes the shift range of the automatic transmission to the P range upon changing of the shift range of the automatic transmission from the P range to the another one of the plurality of ranges by the manual P range releasing means.

3. The shift-by-wire system according to claim 1, further comprising a switch that turns on and off the drive power source, and wherein:

when the switch is turned on, the capacitor is charged with the electric power, which is supplied from the electric power source; and the capacitor stores a predetermined amount of electric power, which is sufficient for the range position changing means and the range control means to change the shift range of the automatic transmission to the P range at least once when an abnormality occurs in at least one of the electric power source and an electric power supply system connected to the electric power source.

4. The shift-by-wire system according to claim 1, wherein the capacitor is shared with another system installed in the vehicle.

5. The shift-by-wire system according to claim 2, further comprising a lever, through which a force is applied to the rod, wherein the lever is provided in a location at which the lever is operable from a driver's seat of the vehicle.

6. The shift-by-wire system according to claim 5, wherein:
the electric motor is a brushless motor; and operation of the lever requires an authentication.

7. The shift-by-wire system according to claim 1, wherein the range control means determines whether the vehicle is stopped based on at least one of:
  (a) an output from a brake device sensor, which senses application of a brake force from a brake device of the vehicle;
  (b) an output from a seat belt sensor, which indicates whether a seat belt of the vehicle is fastened; and
  (c) an output from a load sensor, which senses a load on a driver's seat of the vehicle.

\* \* \* \* \*

UNITED STATES PATENT AND TRADEMARK OFFICE
CERTIFICATE OF CORRECTION

| | | |
|---|---|---|
| PATENT NO. | : 8,281,681 B2 | Page 1 of 1 |
| APPLICATION NO. | : 11/957696 | |
| DATED | : October 9, 2012 | |
| INVENTOR(S) | : Kiyoshi Kimura et al. | |

It is certified that error appears in the above-identified patent and that said Letters Patent is hereby corrected as shown below:

On the title page, under (73) Assignee, change "Toyota" to -- Toyota-city -- and add the following assignee prior to the assignee already named:

DENSO CORPORATION, Kariya-city, Aichi-pref. (JP)

Signed and Sealed this
Fourth Day of December, 2012

David J. Kappos
*Director of the United States Patent and Trademark Office*